United States Patent
Myojin

(10) Patent No.: US 9,496,772 B2
(45) Date of Patent: Nov. 15, 2016

(54) MANUFACTURING METHOD OF LAMINATED IRON CORE

(71) Applicant: MITSUI HIGH-TEC, INC., Fukuoka (JP)

(72) Inventor: Iwao Myojin, Fukuoka (JP)

(73) Assignee: MITSUI HIGH-TEC, INC., Fukuoka (JP)

( * ) Notice: Subject to any disclaimer, the term of this patent is extended or adjusted under 35 U.S.C. 154(b) by 393 days.

(21) Appl. No.: 13/742,640

(22) Filed: Jan. 16, 2013

(65) Prior Publication Data

US 2013/0186158 A1    Jul. 25, 2013

(30) Foreign Application Priority Data

Jan. 19, 2012   (JP) .................. 2012-009147

(51) Int. Cl.
*H02K 15/02*   (2006.01)
*H02K 15/03*   (2006.01)
*H02K 1/14*    (2006.01)

(52) U.S. Cl.
CPC ............... *H02K 15/02* (2013.01); *H02K 15/03* (2013.01)

(58) Field of Classification Search
CPC .............. H02K 15/02; H02K 15/026; H02K 15/03; H02K 1/148; Y10T 29/4906;
(Continued)

(56) References Cited

U.S. PATENT DOCUMENTS

| | | |
|---|---|---|
| 7,378,774 B2 | 5/2008 | Torii et al. |
| 7,777,387 B2 | 8/2010 | Nagai et al. |

(Continued)

FOREIGN PATENT DOCUMENTS

| | | |
|---|---|---|
| CN | 1929246 | 3/2007 |
| CN | 101682219 | 3/2010 |

(Continued)

OTHER PUBLICATIONS

Office Action issued in Japan Counterpart Patent Appl. No. 2012-009147, dated Sep. 1, 2015, along with an English translation thereof.

(Continued)

*Primary Examiner* — Shelley Self
*Assistant Examiner* — Patrick Gunson
(74) *Attorney, Agent, or Firm* — Greenblum & Bernstein, P.L.C.

(57) ABSTRACT

There is provided a manufacturing method of a laminated iron core which is formed of a strip-shaped iron core piece. The strip-shaped iron core piece includes segment iron core pieces connected through a joint positioned in a radial outside, and each of the segment iron core pieces has an artuate shape. The joint by which adjacent segment iron core pieces are connected is folded and lateral ends of the adjacent segment iron core pieces are aligned. The strip-shaped iron core piece is spirally wound while circumferentially shifting mutual joints formed on vertical adjacent layers. Crush processing is performed for flattening a bulged portion in a thickness direction of the segment iron core pieces formed at a time of folding the joint, and the crush processing is performed simultaneously with a time when or after mutual segment iron core pieces arranged vertically are crimped and laminated.

5 Claims, 7 Drawing Sheets

(58) Field of Classification Search
CPC ............... Y10T 29/49062; Y10T 29/49071; Y10T 29/49078
USPC ............ 310/216.043, 216.008, 216.009; 29/596, 598; 72/127, 133, 135, 137, 72/142, 146, 371
See application file for complete search history.

(56) References Cited

U.S. PATENT DOCUMENTS

| | | | |
|---|---|---|---|
| 7,928,627 | B2 | 4/2011 | Nagai et al. |
| 8,106,561 | B2 | 1/2012 | Myojin |
| 2003/0127938 | A1 | 7/2003 | Shen et al. |
| 2007/0046125 | A1* | 3/2007 | Torii et al. ............... 310/156.53 |
| 2010/0001612 | A1 | 1/2010 | Nagai et al. |
| 2010/0090560 | A1* | 4/2010 | Myojin ................. 310/216.043 |
| 2010/0270888 | A1 | 10/2010 | Nagai et al. |

FOREIGN PATENT DOCUMENTS

| | | |
|---|---|---|
| JP | 08-196061 | 7/1996 |
| JP | 3171303 | 3/2001 |
| JP | 2005-160170 | 6/2005 |
| JP | 4150397 | 9/2008 |
| JP | 2011-188651 | 9/2011 |

OTHER PUBLICATIONS

Office Action issued in China Counterpart Patent Appl. No. 20131002185.4, dated Jan. 5, 2016, along with an English translation thereof.

* cited by examiner

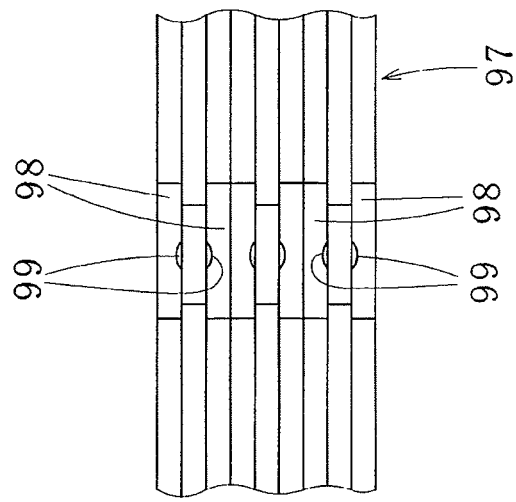
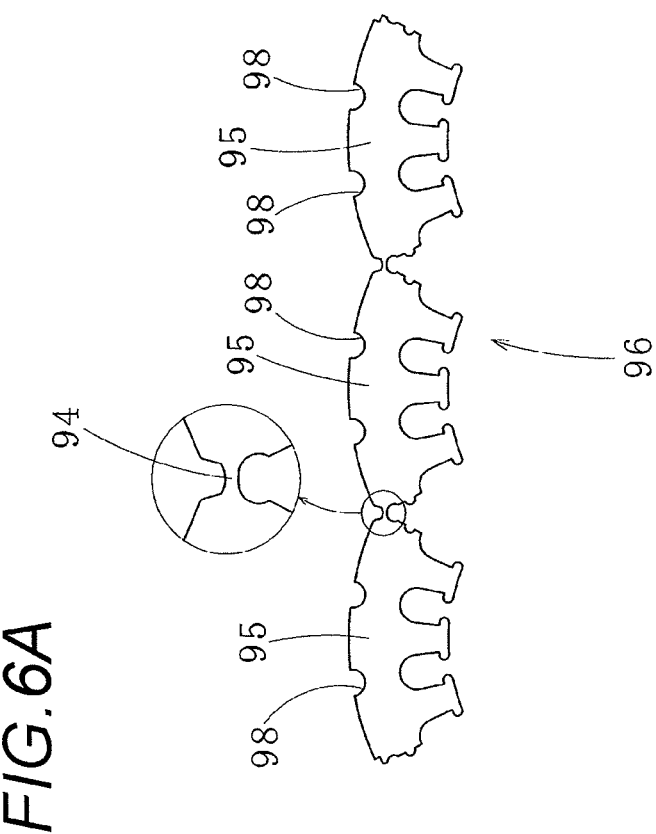
FIG.6A
FIG.6B

MANUFACTURING METHOD OF LAMINATED IRON CORE

BACKGROUND

1. Technical Field

The present invention relates to a manufacturing method of a laminated iron core formed by folding a strip-shaped iron core piece in a joint and spirally winding and laminating the strip-shaped iron core piece in which segment iron core pieces are connected through the joint.

2. Background Art

For example, JP-A-2011-188651 discloses a manufacturing apparatus 84 of a laminated iron core in which a strip-shaped iron core piece 82 in which segment iron core pieces 80 are connected through a rotatable joint 81 is folded in the joint 81 and is spirally wound and also is crimped and laminated through crimp parts 83 formed on the segment iron core pieces 80 as shown in FIG. 5. In a case of manufacturing the laminated iron core using this manufacturing apparatus 84, when the strip-shaped iron core piece 82 is folded in the joint 81, a bulged portion occurs in a thickness direction of the joint 81 and a gap occurs between the vertically adjacent segment iron core pieces 80 due to this bulged portion and variations occur in thickness of the obtained laminated iron core.

Here, reference numeral 85 is a conveyance lane for guiding the strip-shaped iron core piece 82 to a winding start position, and reference numeral 86 is a pilot pin for positioning the segment iron core piece 80, and reference numeral 87 is an insertion hole of the pilot pin 86, and reference numeral 88 is a press roller for pressing the strip-shaped iron core piece 82 moving along the conveyance lane 85 from above, and reference numeral 89 is a drum for supporting the wound and laminated strip-shaped iron core piece 82 from the inside, and reference numerals 90, 91 are a side press roller and an upper side press roller respectively abutting on the outer periphery and the uppermost part of the strip-shaped iron core piece 82 wound and laminated. Also, reference numeral 92 is a push pin for pressing the crimp part 83 of the segment iron core piece 80 of the uppermost part and crimping and laminating the crimp part 83 to the segment iron core piece 80 of the lower side, and reference numeral 93 is a crimp mold including the pilot pins 86 and the push pins 92.

Because of this, for example, Japanese Patent No. 4150397 describes a situation in which when a strip-shaped iron core piece 96 in which segment iron core pieces 95 are connected through a joint 94 is folded in the joint 94 and is spirally wound and also the vertical segment iron core pieces 95 are crimped and laminated and a laminated iron core 97 is formed, the outer peripheral side of the segment iron core piece 95 is previously provided with a receiving part 98 made of a notch or a hole and bulged portions 99 occurring in the folded joint 94 are received in the receiving parts 98 of the vertically arranged segment iron core pieces 95 and thereby a gap between the segment iron core pieces 95 is prevented from occurring as shown in FIGS. 6A and 6B.

Also, Japanese Patent No. 3171303 discloses a laminated iron core 104 for stator in which by thinning a joint 101 through which partial yoke iron core pieces 100 are connected, a relief part 103 for receiving a bulged portion 102 formed in the case of folding the joint 101 is previously formed inside the partial yoke iron core piece 100 and a gap (an increase in distance of lamination) occurring in the case of laminating the partial yoke iron core pieces 100 is prevented and a decrease in crimp strength is prevented as shown in FIG. 7.

SUMMARY

However, in the laminated iron core 97 described in Japanese Patent No. 4150397, the receiving part 98 is formed in the segment iron core piece 95. In the laminated iron core 104 for stator described in Japanese Patent No. 3171303, the relief part 103 is formed in the partial yoke iron core piece 100. Thus, there is a problem of decreasing magnetic properties. Further, when the laminated iron core 97 described in Japanese Patent No. 4150397 is used in a rotor, there is a problem that abnormal noise occurs at the time of rotation.

The invention has been implemented in view of such circumstances, and an object of the invention is to provide a manufacturing method of a laminated iron core capable of laminating segment iron core pieces with no gap without being influenced by a bulged portion in a thickness direction of the segment iron core pieces formed in a joint when a strip-shaped iron core piece, in which the segment iron core pieces are connected through the joint, is folded in the joint and is spirally wound and laminated.

An aspect of the present invention provides a manufacturing method of a laminated iron core which is formed of a strip-shaped iron core piece, wherein the strip-shaped iron core piece includes segment iron core pieces which are connected through a joint positioned in a radial outside, and each of the segment iron core pieces has an artuate shape with respectively concentric outer and inner peripheries having different radii, the manufacturing method including: folding the joint by which adjacent segment iron core pieces are connected and aligning lateral ends of the adjacent segment iron core pieces; spirally winding the strip-shaped iron core piece while circumferentially shifting mutual joints formed on vertical adjacent layers; and crimping and laminating the strip-shaped iron core piece through crimp parts formed on the segment iron core pieces, thereby forming the laminated iron core, wherein the manufacturing method further includes crush processing for flattening a bulged portion in a thickness direction of the segment iron core pieces formed at a time of folding the joint, the crush processing being performed simultaneously with a time when mutual segment iron core pieces arranged vertically are crimped and laminated or after the segment iron core pieces arranged vertically are crimped and laminated.

The manufacturing method of the laminated iron core may be configured so that the crush processing is performed on the bulged portion formed on the joint by which a first segment iron core piece crimped and laminated already is connected to a second segment iron core piece to be joined to the first segment iron core piece and to be crimped and laminated next.

The manufacturing method of the laminated iron core may be configured so that an outside of the folded joint is provided with a notch recessed in a radial inside, and a deformed portion projected to a radial outside of the segment iron core piece when the crush processing of the bulged portion is performed is received in the notch.

In the manufacturing method of the laminated iron core according to the aspect of the invention, when the crush processing for flattening the bulged portion in the thickness direction of the segment iron core pieces formed at the time of folding the joint is performed simultaneously with the time when the mutual segment iron core pieces arranged vertically are crimped and laminated, the segment iron core piece at one side of the joint is crimped and laminated to an annular laminated body formed already and becomes fixed, and the segment iron core piece present in the other side of the joint, to be crimped and laminated, is positioned with respect to the laminated body, so that the segment iron core pieces can be prevented from moving circumferentially with the crush processing of the bulged portion. On the other hand, when the crush processing is performed after the mutual segment iron core pieces arranged vertically are crimped and laminated, the segment iron core pieces present in both sides of the joint are crimped and laminated to the annular laminated body formed already and become fixed, so that the segment iron core pieces can be prevented from moving circumferentially with the crush processing of the bulged portion. As a result, a gap can be prevented from occurring between the segment iron core pieces present in both sides of the joint.

Then, the bulged portion is flattened and a thickness of the folded joint becomes equal to a thickness of the segment iron core piece, so that a gap can be prevented from occurring between the vertically adjacent segment iron core pieces when the segment iron core pieces are arranged on this joint and are crimped and laminated. As a result, a thickness of the laminated iron core becomes uniform and shape accuracy is improved and also, crimp bonding strength is improved.

Further, a situation in which a receiving part is formed in a segment iron core piece or the segment iron core piece is thinned to form a relief part as before does not occur, so that abnormal noise does not occur at the time of rotation and also, magnetic properties are improved.

In the manufacturing method of the laminated iron core, when the crush processing is performed on the bulged portion formed on the joint by which the first segment iron core piece crimped and laminated already is connected to the second segment iron core piece to be joined to the first segment iron core piece and be crimped and laminated next, the crush processing and the crimp lamination can be performed in the same step and productivity of the laminated iron core is improved.

In the manufacturing method of the laminated iron core, when the outside of the joint is provided with the notch recessed in the radial inside and the deformed portion projected to the radial outside of the segment iron core piece in the case of performing the crush processing of the bulged portion is received in the notch, accuracy of dimensions and shape of the outer peripheral side of the laminated iron core is improved.

BRIEF DESCRIPTION OF THE DRAWINGS

In the accompanying drawings:

FIGS. 6A and 6B are explanatory diagrams of a laminated iron core according to a related example.

DETAILED DESCRIPTION

Subsequently, an embodiment of the invention will be described with reference to the accompanying drawings and be used for understanding of the invention.

Figure 1:
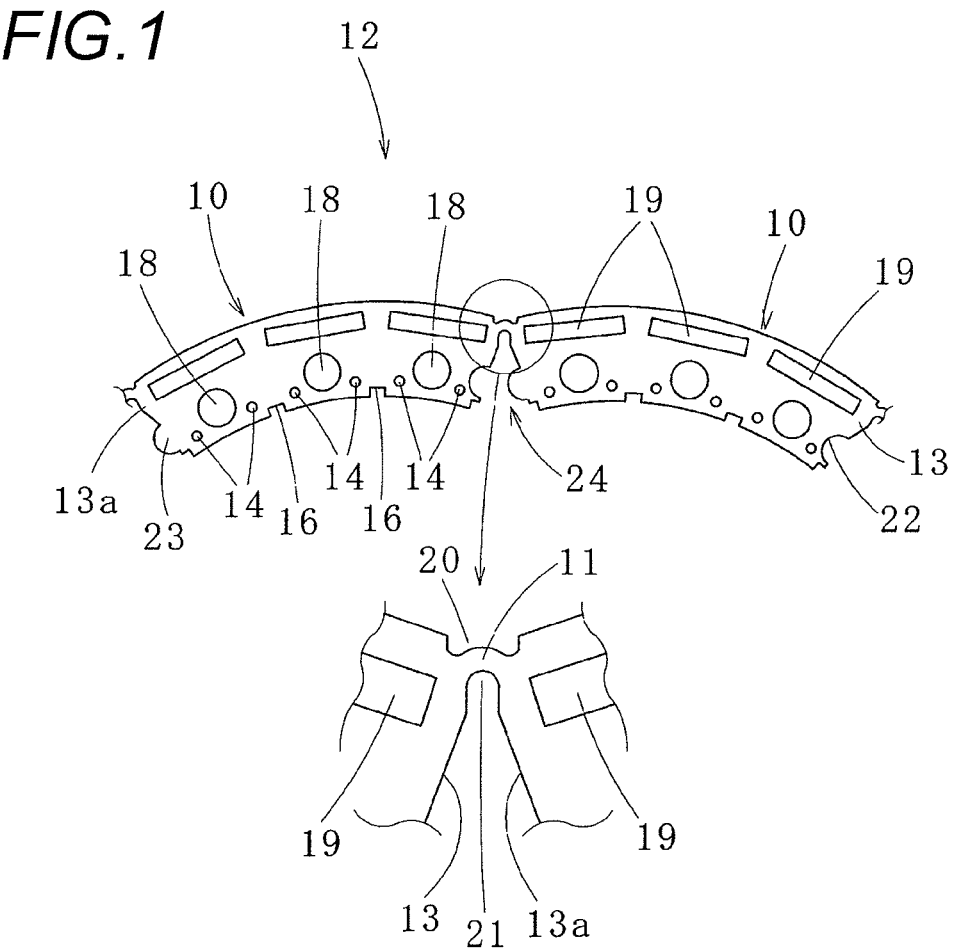
FIG. 1 is a plan view of segment iron core pieces connected through a joint used in a manufacturing method of a laminated iron core according to one embodiment of the invention.

A manufacturing method of a laminated iron core according to one embodiment of the invention is a method for manufacturing a laminated iron core (not shown) by spirally winding a strip-shaped iron core piece 12, in which arcuate segment iron core pieces 10 with respectively concentric outer and inner peripheries having different radii are connected through a joint 11 positioned in a radial outside, while folding the strip-shaped iron core piece 12 in the joint 11 and aligning lateral ends 13, 13a of the adjacent segment iron core pieces 10 and also circumferentially shifting the mutual joints 11 formed on vertical adjacent layers and crimping and laminating the strip-shaped iron core piece 12 through crimp parts 14 formed on the segment iron core pieces 10 as shown in FIG. 1.

First, the strip-shaped iron core piece 12 used in the manufacturing method of the laminated iron core according to the present embodiment and a manufacturing apparatus 15 (hereinafter, simply called a manufacturing apparatus 15) for manufacturing the laminated iron core will be respectively described and then, the manufacturing method of the laminated iron core according to the embodiment will be described.

The strip-shaped iron core piece 12 is punched and formed from an electromagnetic steel sheet with, for example, a thickness of about 0.5 mm or less. The plural (six in FIG. 1) crimp parts 14 of the segment iron core piece 10 are formed along an inner periphery in the inner peripheral side of the segment iron core piece 10. Then, in the crimp parts 14, the upper side is recessed and the lower side is downwardly projected according to the recess of the upper side. Consequently, in the segment iron core pieces 10 arranged vertically, the projected portion of the crimp part 14 of the segment iron core piece 10 present in the upper side is fitted and fixed into the recess of the crimp part 14 of the segment iron core piece 10 present in the lower side. In addition, in the strip-shaped iron core piece 12 wound, the crimp part 14 of the segment iron core piece 10 arranged in the lowermost layer (first layer) is formed in a through hole and the projected portion of the crimp part 14 of the segment iron core piece 10 arranged in the second layer is fitted into this through hole.

For example, plural (two in FIG. 1) square or rectangular hooking recesses 16 opened in an inner periphery are formed in a radial inside of the segment iron core piece 10. Also, for example, plural (three in FIG. 1) rectangular magnet holes 19 along an outer periphery are formed in a radial outside of the segment iron core piece 10, and a pair of crimp parts 14 is formed in a position of the radial inside of the segment iron core piece 10 opposed to each of the magnet holes 19. Then, plural (three in FIG. 1) pilot holes 18 into which the top sides of pilot pins 17 (see FIG. 2) for positioning the segment iron core pieces 10 are inserted in the case of winding the strip-shaped iron core piece 12 and crimping and laminating the vertical segment iron core pieces 10 are formed in positions of the radial outside in the circumferential middle of the adjacent crimp parts 14.

The further radial outside of the joint 11 positioned in the radial outside is provided with a notch 20 recessed in the radial inside, and the radial inside of the joint 11 is provided with an inside notch 21 with a U shape in plan view. Accordingly, in the case of folding the joint 11, a deformed portion projected to the radial outside can be received inside the notch 20 and also radial outside regions of adjacent lateral ends 13, 13*a* can be prevented from interfering mutually. Further, a radial inside region of one lateral end 13 of the adjacent segment iron core pieces 10 is provided with a recess 22 and a radial inside region of the other lateral end 13*a* is provided with a protrusion 23 fitted into the recess 22, respectively, and an engaging part 24 is constructed. Accordingly, positioning in the case of aligning the lateral ends 13, 13*a* of the adjacent segment iron core pieces 10 can be performed and the lateral ends 13, 13*a* can be prevented from being mutually misaligned radially after alignment.

Figure 2:
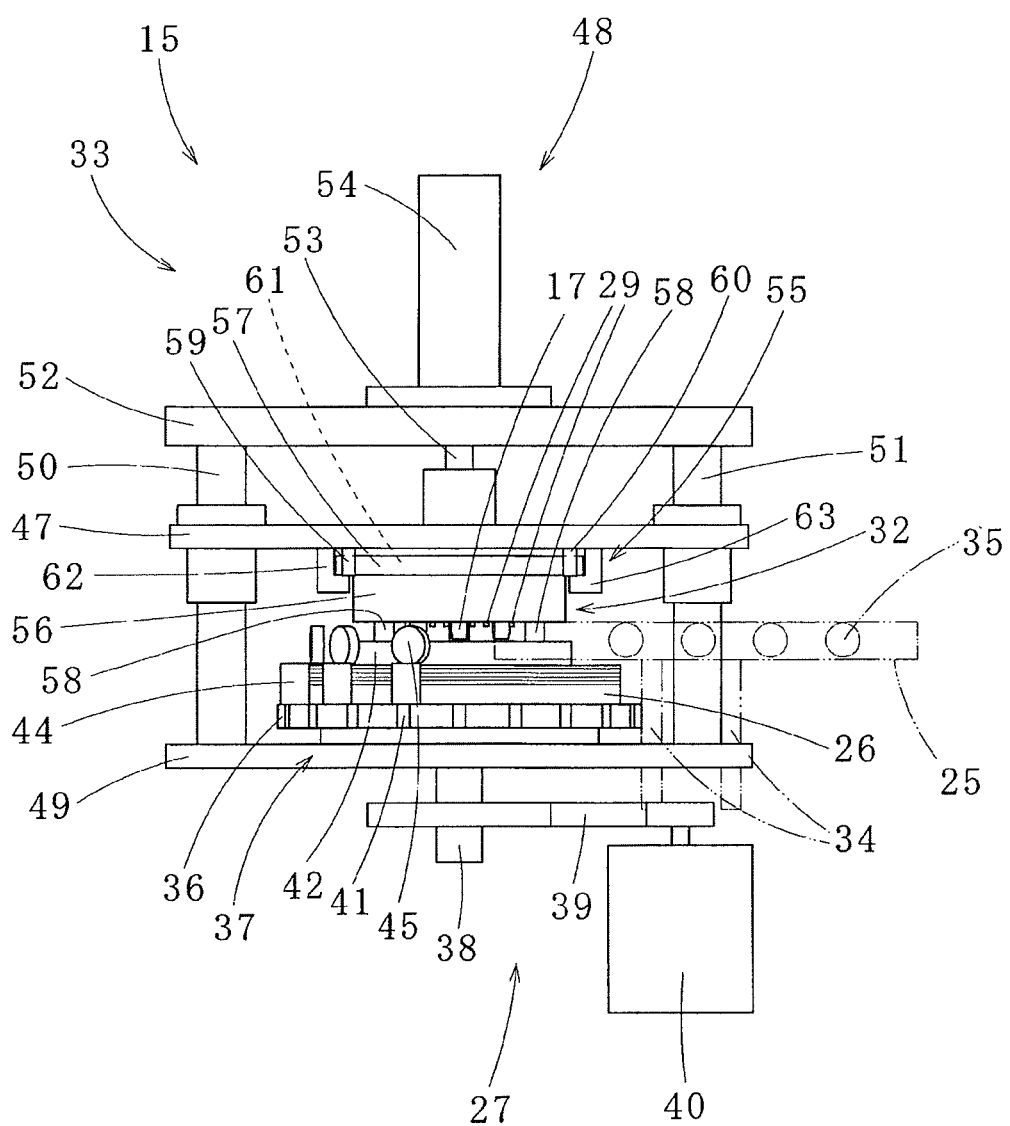
FIG. 2 is a front view of a manufacturing apparatus of the laminated iron core used in the manufacturing method of the laminated iron core.
Figure 3:
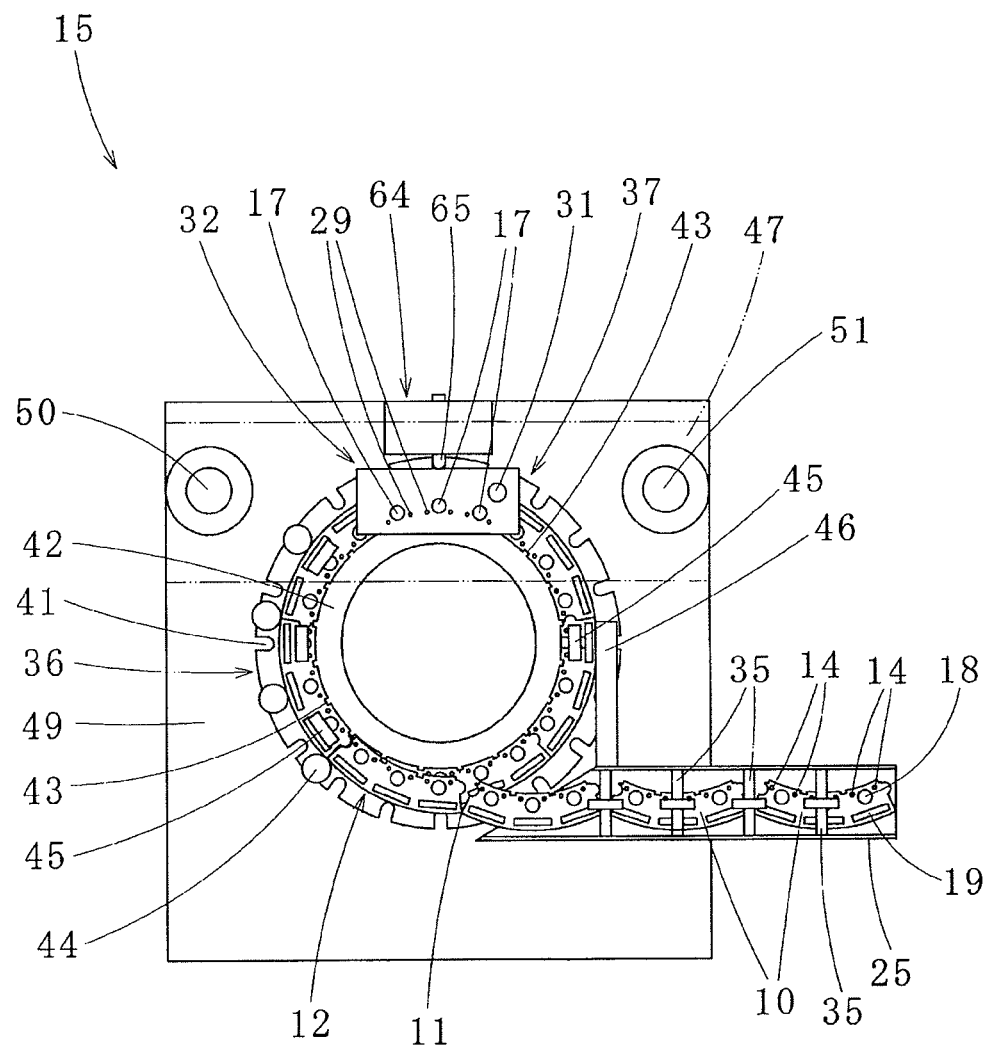
FIG. 3 is a partial plan view of the manufacturing apparatus of the laminated iron core used in the manufacturing method of the laminated iron core in which some of components are omitted.

As shown in FIGS. 2 and 3, the manufacturing apparatus 15 has winding means 27 including a conveyance lane 25 for guiding the strip-shaped iron core piece 12 supplied from a reel (not shown) and a ring-shaped turntable 26 on which the segment iron core pieces 10 are placed while folding the strip-shaped iron core piece 12 in the joint 11 and spirally winding and laminating the continuous segment iron core pieces 10, and crimp and crushing means 33 including a crimp pressing mold 32 having the pilot pins 17 for positioning the laminated segment iron core pieces 10, crimp pins 29 for pressing the crimp parts 14 and crimping and coupling the vertically laminated segment iron core pieces 10 and a crushing pin 31 for pushing and flattening a bulged portion 30 (see FIG. 4) of the joint 11.

The conveyance lane 25 is horizontally held by a support member 34 erected. Then, over the conveyance lane 25, plural press rollers 35 for pressing the strip-shaped iron core piece 12 moving on the conveyance lane 25 from above are arranged with rotary shafts orthogonal to a conveyance direction. Accordingly, the strip-shaped iron core piece 12 moving on the conveyance lane 25 is prevented from floating up, and the strip-shaped iron core piece 12 can be stably supplied in a winding start position of the inside of the winding means 27.

The winding means 27 has a rotating table 37 including a disk table 36 on which the turntable 26 is placed, a rotary shaft 38 attached to the center of a lower surface of the rotating table 37, and a driving motor 40 connected to the rotary shaft 38 through a power transmission belt 39. Then, plural positioning grooves 41 equally spaced are formed in an outer periphery of the disk table 36. Also, in the rotating table 37, a ring-shaped drum 42 abutting on an outer periphery is mounted in an inner periphery of the turntable 26 and inside the strip-shaped iron core piece 12 wound and laminated. Here, the disk table 36, the drum 42 and the turntable 26 rotate around the rotary shaft 38 of the rotating table 37 at the same rotational speed.

In addition, the winding means 27 is provided with a lift mechanism (not shown) for moving up and down a region in a winding start position of the wound strip-shaped iron core piece 12 on the turntable 26 so as to be in substantially the same height position as the conveyance lane 25.

The outer periphery of the drum 42 is provided with projections 43 whose top sides are inserted into the hooking recesses 16 of the segment iron core pieces 10. Then, the drum 42 and the segment iron core pieces 10 (the strip-shaped iron core piece 12) are positioned by inserting the top sides of the projections 43 into the hooking recesses 16 of the segment iron core pieces 10 in the winding start position of the strip-shaped iron core piece 12.

The crimp and crushing means 33 has the crimp pressing mold 32, a movable table 47 for holding the crimp pressing mold 32, and a lift driving mechanism 48 for moving up and down the movable table 47. Here, the lift driving mechanism 48 has a base plate 49 horizontally fixed to a fixed frame (not shown), a pair of guide rods 50, 51 arranged and erected on the base plate 49, a horizontal plate 52 whose both left and right sides are respectively fixed to the upper ends of the guide rods 50, 51, and an oil hydraulic cylinder 54 attached to the center of the horizontal plate 52, the cylinder 54 in which the distal end of a piston rod 53 is joined to the movable table 47. In addition, the rotary shaft 38 of the rotating table 37 is inserted into the center of the base plate 49.

Also, a fixing member 64 for aligning the crimp pressing mold 32 and the segment iron core pieces 10 is arranged over the base plate 49. The fixing member 64 has a positioning pin 65, and this positioning pin 65 is fitted into the positioning grooves 41 of the disk table 36, and the crimp pressing mold 32 and the segment iron core pieces 10 placed on the turntable 26 are positioned. Then, the segment iron core pieces 10 become positioned with respect to the drum 42 rotating at the same rotational speed as the turntable 26 concentrically, so that the segment iron core pieces 10 are laminated without being misaligned vertically in a winding direction. As a result, in a laminated iron core formed by crimping and laminating the vertical segment iron core pieces 10, the magnet holes 19 are vertically continuously arranged with the center aligned, and magnet insertion holes are formed in the laminated iron core.

Further, the manufacturing apparatus 15 is provided with plural side press rollers 44 and plural upper side press rollers 45 respectively abutting on the outer periphery and the uppermost part of the strip-shaped iron core piece 12 wound and laminated by the winding means 27. The side press rollers 44 are rotatably attached to a support member (not shown), and presses the abutting segment iron core pieces 10 on the side of the drum 42, and holds a fixed state of the projections 43 and the hooking recesses 16 of the segment iron core pieces 10. The upper side press rollers 45 are rotatably attached to height adjusting members 46 (only one is described in FIG. 3) fixed to a fixed frame (not shown), and the segment iron core piece 10 present on the uppermost part of the strip-shaped iron core piece 12 wound and laminated is prevented from becoming floating from the segment iron core piece 10 present on the lower side of the uppermost segment iron core piece 10.

The crimp pressing mold 32 moved up and down and held in the movable table 47 through a holding mechanism 55 includes a box-shaped frame body 56 respectively including the plural (three in FIG. 3) pilot pins 17, the plural (six in FIG. 3) crimp pins 29 and the one crushing pin 31 in the inside, and a plate-shaped upper mold 57 which makes close contact with an upper part of the box-shaped frame body 56 and is horizontally arranged in a state having a gap with the movable table 47. In each of the pilot pins 17, each of the crimp pins 29 and the crushing pin 31, the proximal end is fixed to the bottom of the upper mold 57 and each shaft center is arranged along a lift direction of the movable table 47. Further, the crimp pressing mold 32 is provided with a bar-shaped side pressing member 58 for inwardly pressing the segment iron core pieces 10 (the strip-shaped iron core piece 12) wound by the winding means 27 and pushing the segment iron core pieces 10 on the drum 42.

Here, the crushing pin 31 is formed inside the box-shaped frame body 56 so as to be arranged (opposed) over the joint 11 appearing in the uppermost surface in the case of spirally winding and laminating the segment iron core pieces 10 while folding the strip-shaped iron core piece 12 in the joint 11 and aligning the lateral ends 13, 13a of the adjacent segment iron core pieces 10. Also, each of the pilot pins 17 and each of the crimp pins 29 are formed inside the box-shaped frame body 56 so as to be respectively arranged over each of the pilot holes 18 and each of the crimp parts 14 of the segment iron core pieces 10 of the upstream side (reel side) beyond the joint 11 opposed to the crushing pin 31.

By being configured as described above, for example, the crushing pin 31 can be arranged over the joint 11 through which the segment iron core piece (segment iron core piece A) 10 crimped and laminated already is connected to the segment iron core piece (segment iron core piece B) 10 (of the upstream side, that is, the reel side) to be crimped and laminated next and also, each of the pilot pins 17 and each of the crimp pins 29 can be respectively arranged over each of the pilot holes 18 and each of the crimp parts 14 of the segment iron core piece 10 to be crimped and laminated next in the upstream side.

Hence, by moving down the crimp pressing mold 32 together with the movable table 47, the pilot pins 17, the crimp pins 29 and the crushing pin 31 are moved down in each of the shaft center directions and the pilot pins 17 are inserted into the pilot holes 18 of the segment iron core piece 10 to be crimped and laminated next, the segment iron core piece 10 which is present just under the box-shaped frame body 56 of the crimp pressing mold 32 and becomes fixed by the side pressing member 58, and thereby positioning of the crimp pins 29 and the crimp parts 14 and positioning of the crushing pin 31 and the joint 11 (bulged portion 30) can be performed, respectively. Then, the crimp parts 14 can be depressed by the distal ends of the crimp pins 29 to be fitted into the crimp parts 14 of the segment iron core piece 10 present just under the segment iron core piece 10 whose the crimp parts 14 are depressed and also, the bulged portion 30 can be crushed and pushed to be flattened.

The holding mechanism 55 for holding the crimp pressing mold 32 in the movable table 47 has forward movement limiting members 59, 60 respectively arranged in both front sides of the crimp pressing mold 32 in a state having a distance from the crimp pressing mold 32, a backward movement limiting member 61 arranged in the back side of the crimp pressing mold 32, and holding arms 62, 63 respectively arranged in the left and right of the crimp pressing mold 32. Here, in the forward movement limiting members 59, 60, the basal part is fixed to the lower part of the movable table 47 with the shaft center set vertically. Accordingly, the crimp pressing mold 32 can be moved with respect to the movable table 47 within the range limited by the forward and backward movement limiting members 59, 60, 61.

In addition, insertion holes (not shown) into which the tops of the pilot pins 17 and the crimp pins 29 can be respectively inserted are formed in the turntable 26. Also, the upper end of the turntable 26 is provided with turntable inclination means (not shown) for vertically holding a shaft center direction of the annular strip-shaped iron core piece 12 by abutting on a lower surface of the lowermost strip-shaped iron core piece 12 wound spirally so as to horizontally set the segment iron core piece 10 present just under the box-shaped frame body 56 of the crimp pressing mold 32. Further, the movable table 47 is provided with a first inclination mechanism (not shown) capable of swinging in a certain angular range from a direction vertical to the shaft centers of the guide rods 50, 51, and the crimp pressing mold 32 is provided with a second inclination mechanism (not shown) for holding each of the shaft centers of the pilot pins 17, the crimp pins 29 and the crushing pin 31 vertically to the movable table 47, respectively. By such a configuration, the vertically arranged segment iron core pieces 10 can be crimped and laminated, and the bulged portion 30 formed in the joint 11 can be flattened surely.

Subsequently, the manufacturing method of the laminated iron core according to one embodiment of the invention will be described.

Figure 4:
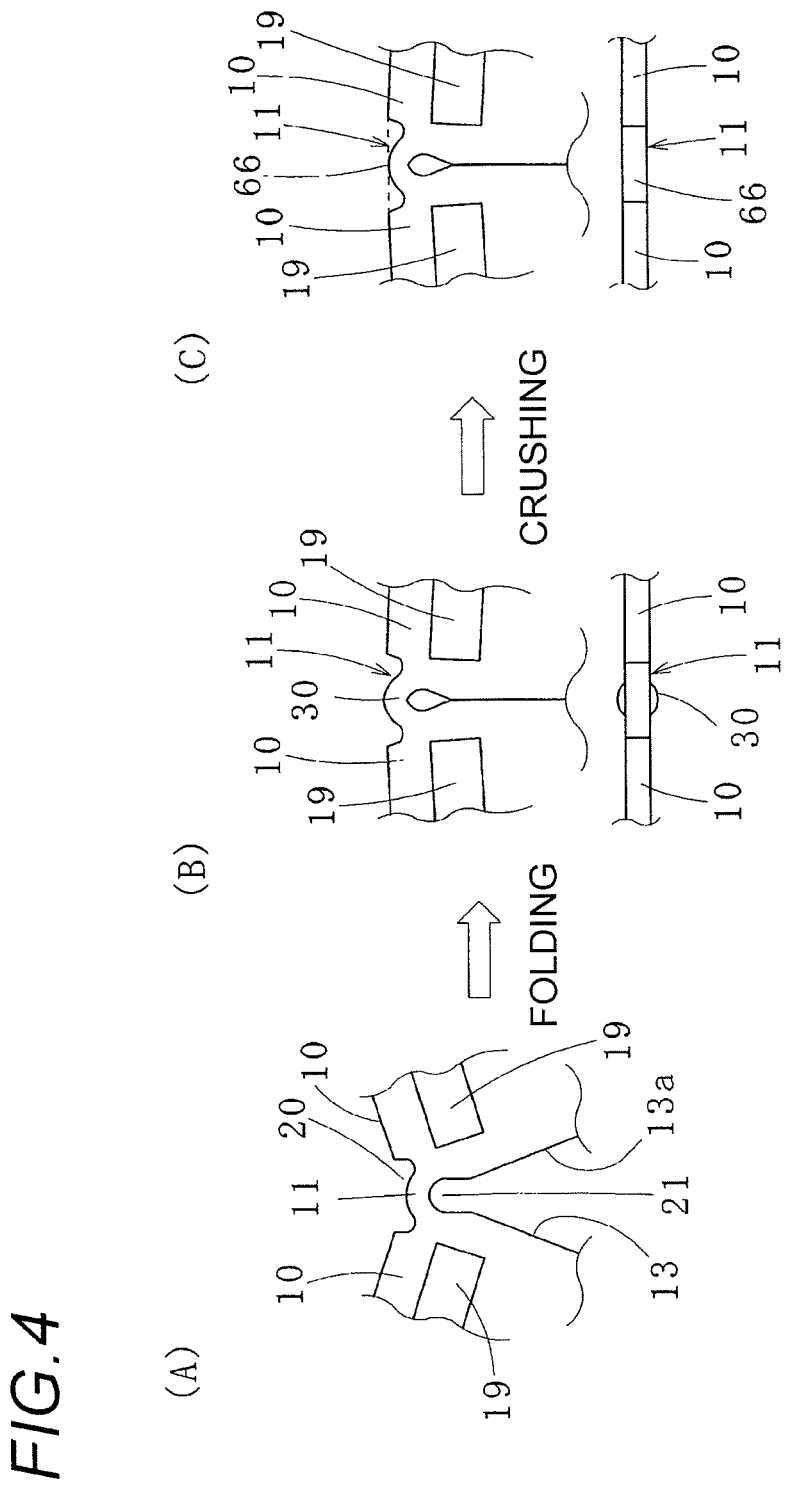
In FIG. 4, (A) is an explanatory diagram of the joint before folding in the manufacturing method of the laminated iron core, (B) is an explanatory diagram of the joint after folding, and (C) is an explanatory diagram of the joint after crush processing.
Figure 5:
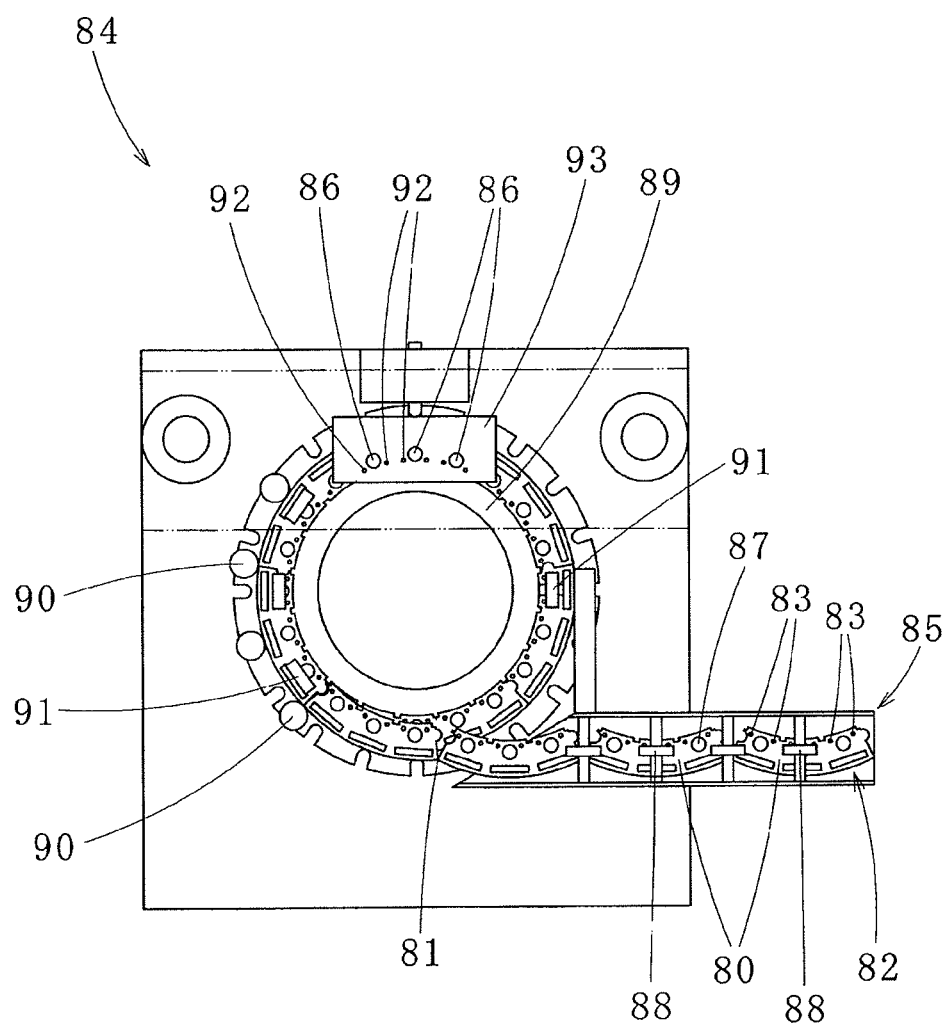
FIG. 5 is an explanatory diagram of a manufacturing apparatus of a laminated iron core according to a related example.
Figure 7:
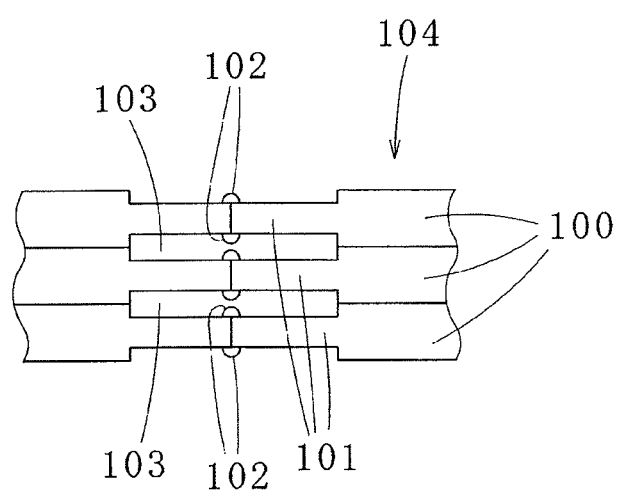
FIG. 7 is an explanatory diagram of a laminated iron core for stator according to a related example.

In the manufacturing method of the laminated iron core according to the present embodiment, as shown in FIG. 1, the arcuate segment iron core pieces 10 connected through the joint 11 are spirally wound while being folded in the joint 11 and aligning the lateral ends 13, 13a of the adjacent segment iron core pieces 10 and also circumferentially shifting the mutual joints 11 formed on vertical adjacent layers, and are crimped and laminated through the crimp parts 14 formed on the segment iron core pieces 10 and the laminated iron core is manufactured. When the joint 11 shown by (A) in FIG. 4 is folded and the lateral ends 13, 13a of the adjacent segment iron core pieces 10 are aligned at this time, the bulged portion 30 bulged in a thickness direction of the segment iron core pieces 10 is formed in the joint 11 as shown by (B) in FIG. 4.

To address the existence of the bulged portion 30, the crimp pressing mold 32 of the crimp and crushing means 33 is moved down, and the pilot pins 17 are inserted into the pilot holes 18 of the segment iron core piece 10 present just under the box-shaped frame body 56 of the crimp pressing mold 32, and positioning of the crimp pins 29 and the crimp parts 14 and positioning of the crushing pin 31 and the bulged portion 30 of the joint 11 are performed, respectively. Then, the crimp parts 14 of the segment iron core piece 10 present just under the box-shaped frame body 56 are depressed by the distal ends of the crimp pins 29, and are fitted into the crimp parts 14 of the segment iron core piece 10 present just under the segment iron core piece 10 whose crimp parts 14 are depressed, and the segment iron core pieces 10 are crimped and laminated and also, crush processing for pressing the bulged portion 30 by the crushing pin 31 is performed and thereby, the bulged portion 30 is pushed and crushed to be flattened as shown by (C) in FIG. 4.

Since the crush processing for flattening the bulged portion 30 is herein performed simultaneously with the time when the mutual segment iron core pieces 10 arranged vertically are crimped and laminated, the segment iron core piece 10 at the downstream side (the front side of the strip-shaped iron core piece 12) beyond the joint 11 present just under the crushing pin 31 is crimped and laminated to an annular laminated body formed already and becomes fixed, and the segment iron core piece 10 present in the upstream side beyond the joint 11, to be crimped and laminated, is positioned by the pilot pins 17, so that the segment iron core pieces 10 present in both sides of the joint 11 can be prevented from moving circumferentially even in the case of performing the crush processing of the bulged portion 30. As a result, a gap can be prevented from occurring between the segment iron core pieces 10 present in both sides of the joint 11.

Also, the bulged portion 30 is flattened and a thickness of the folded joint 11 becomes equal to a thickness of the segment iron core piece 10, so that a gap can be prevented from occurring between the vertical segment iron core pieces 10 even when the segment iron core pieces 10 are arranged on this joint 11 and are crimped and laminated.

As a result, a thickness of the laminated iron core becomes uniform and shape accuracy is improved and also, crimp bonding strength is improved. Then, a situation in which a receiving part is formed in a segment iron core piece or the segment iron core piece is thinned to form a relief part as before does not occur, so that when the laminated iron core is used as a rotor, abnormal noise does not occur at the time of rotation and also, magnetic properties are improved. Further, crush processing is performed simultaneously with the time when the mutual segment iron core pieces 10 arranged vertically are crimped and laminated, so that the crush processing and the crimp lamination are performed in the same step and productivity of the laminated iron core can be improved.

In addition, when crush processing of the bulged portion 30 is performed, a material constructing the folded joint 11 moves to the radial outside of the segment iron core piece 10, so that a deformed portion 66 (see (C) in FIG. 4) projected to the radial outside is formed in the joint 11, but in the strip-shaped iron core piece 12, the outside of the joint 11 is provided with the notch 20 recessed in the radial inside, so that the deformed portion 66 is received inside the notch 20. As a result, the distal side of the deformed portion 66 can be prevented from projecting from a lateral peripheral surface of the laminated iron core formed, and accuracy of dimensions and shape of the outer peripheral side of the laminated iron core can be improved.

The invention has been described above with reference to the embodiment, but the invention is not limited to the configuration described in the embodiment described above, and includes other embodiments or modified examples contemplated within the scope of the matter described in the claims.

Further, the invention includes combinations of components respectively included in the present embodiment, other embodiments or modified examples.

For example, the embodiment describes a case where crush processing is performed simultaneously with the time when the mutual segment iron core pieces arranged vertically are crimped and laminated, but the crush processing may be performed after the segment iron core pieces arranged vertically are crimped and laminated. In this case, it is necessary to construct the crimp and crushing means of a crimp mold including pilot pins and crimp pins, a crimp lift driving mechanism for moving up and down the crimp mold, a pressing mold including a crushing pin, and a pressing lift driving mechanism for moving up and down the pressing mold, and arrange the pressing mold between the crimp mold and a winding start position of the strip-shaped iron core piece 12.

This application is based upon and claims the benefit of priority of Japanese Patent Application No. 2012-009147 filed on Jan. 19, 2012, the contents of which are incorporated herein by reference in its entirety.

What is claimed is:

1. A manufacturing method of a laminated iron core which is formed of a strip-shaped iron core piece, wherein
the strip-shaped iron core piece includes segment iron core pieces which are connected through a joint positioned in a radial outside, and each of the segment iron core pieces has an arcuate shape with respectively concentric outer and inner peripheries having different radii,
the manufacturing method comprising:
folding the joint by which adjacent segment iron core pieces are connected and aligning lateral ends of the adjacent segment iron core pieces;
spirally winding the strip-shaped iron core piece while circumferentially shifting mutual joints formed on vertical adjacent layers;
laminating upper segment iron core pieces to lower segment iron core pieces that are positioned vertically beneath the upper segment iron core pieces to form the laminated iron core; and
crimping upper segment iron core pieces to lower segment iron core pieces through crimp parts formed on the upper segment iron core pieces and the lower segment iron core pieces, wherein
the manufacturing method further comprises crush processing for flattening a bulged portion in a thickness direction of the segment iron core pieces formed at a three of folding the joint, the crush processing being performed simultaneously with a time when upper and lower segment iron core pieces arranged vertically are crimped by a crimp pressing mold including a crimp pin that presses the crimp parts and crimps and couples the upper segment iron core pieces to the lower segment iron core pieces, and a crushing pin that pushes and flattens the bulged portion.

2. The manufacturing method of the laminated iron core according to claim 1, wherein the crush processing is performed on the bulged portion formed on the joint by which a first of the segment iron core pieces that is crimped is connected to a second of the segment iron core pieces to be joined to the first of the segment iron core pieces and to be crimped next.

3. The manufacturing method of the laminated iron core according to claim 1, wherein an outside of the folded joint is provided with a notch that is recessed inwardly from an outer periphery of the segment iron core pieces, and a deformed portion, which projects toward the outer periphery of the segment iron core piece and results from the crush processing of the bulged portion, is received in the notch.

4. The manufacturing method of the laminated iron core according to claim 1, wherein the crimp pressing mold further includes a pilot pin that is inserted into a pilot hole of the segment iron core pieces to position the segment iron core pieces.

5. The manufacturing method of the laminated iron core according to claim 4, wherein the crimp pin and the pilot pin are provided at a side of the crimp pressing mold that is upstream of the crushing pin.

* * * * *

UNITED STATES PATENT AND TRADEMARK OFFICE
CERTIFICATE OF CORRECTION

PATENT NO.         : 9,496,772 B2                                           Page 1 of 1
APPLICATION NO.    : 13/742640
DATED              : November 15, 2016
INVENTOR(S)        : Iwao Myojin It is certified that error appears in the above-identified patent and that said Letters Patent is hereby corrected as shown below:

In the Claims

Column 10, Line 28 (Claim 1, Line 27) of the printed patent, "three of folding" should read
--time of folding--

Signed and Sealed this
Fourteenth Day of March, 2017

Michelle K. Lee
*Director of the United States Patent and Trademark Office*